(12) United States Patent
Bianchi et al.

(10) Patent No.: US 12,193,599 B2
(45) Date of Patent: Jan. 14, 2025

(54) ACTIVE SYSTEM FOR MONITORING AND FILTERING THE WATER FOR AN ESPRESSO COFFEE MACHINE AND ASSOCIATED ESPRESSO COFFEE MACHINE

(71) Applicant: LA MARZOCCO S.R.L., Scarperia (IT)

(72) Inventors: Roberto Bianchi, Scarperia (IT); Riccardo Gatti, Scarperia (IT); Enrico Wurm, Scarperia (IT); Filippo Francini, Scarperia (IT); Massimo Innocenti, Sesto Florentino (IT)

(73) Assignee: LA MARZOCCO S.R.L., Scarperia (IT)

( * ) Notice: Subject to any disclaimer, the term of this patent is extended or adjusted under 35 U.S.C. 154(b) by 869 days.

(21) Appl. No.: 17/286,133

(22) PCT Filed: Oct. 30, 2019

(86) PCT No.: PCT/EP2019/079672
§ 371 (c)(1),
(2) Date: Apr. 16, 2021

(87) PCT Pub. No.: WO2020/089297
PCT Pub. Date: May 7, 2020

(65) Prior Publication Data
US 2021/0315415 A1    Oct. 14, 2021

(30) Foreign Application Priority Data

Oct. 30, 2018 (IT) .................. 102018000009919

(51) Int. Cl.
*A47J 31/52* (2006.01)
*A47J 31/06* (2006.01)
(Continued)

(52) U.S. Cl.
CPC ....... *A47J 31/5253* (2018.08); *A47J 31/0689* (2013.01); *A47J 31/461* (2018.08); *A47J 31/605* (2013.01)

(58) Field of Classification Search
CPC .. A47J 31/5253; A47J 31/461; A47J 31/0689; A47J 31/605; A47J 31/60
See application file for complete search history.

(56) References Cited

U.S. PATENT DOCUMENTS 4,967,648 A   11/1990 Helbling
5,133,983 A   7/1992 Greiwe
(Continued)

FOREIGN PATENT DOCUMENTS

AU     2015100960       9/2015
CA     2962617 A1       4/2016
(Continued)

OTHER PUBLICATIONS

U.S. Appl. No. 17/289,093, filed Apr. 27, 2021, entitled "Espresso Coffee Machine With Adjustment of the Dispensing Pressure and Method for Adjusting the Dispensing Pressure of an Espresso Coffee Machine".

(Continued)

*Primary Examiner* — Nathaniel E Wiehe
*Assistant Examiner* — Dilnessa B Belay
(74) *Attorney, Agent, or Firm* — NIXON & VANDERHYE P.C.

(57) ABSTRACT

An espresso coffee machine is described, said machine comprising: a water supply; a boiler for heating the water; a pump; a dispensing group configured to cooperate with a portafilter equipped with a filter basket with a puck of coffee powder, the machine being configured to supply pressurized water to said coffee powder puck for dispensing an espresso coffee, and a water monitoring system for monitoring at least (Continued)

one parameter of the water used for preparation of the espresso coffee. Preferably, the monitoring system comprises a conductivity and temperature probe which provides values, continuously and in real time, of water hardness derived from information on the electrical conductivity and temperature of the water.

15 Claims, 4 Drawing Sheets

(51) Int. Cl.
*A47J 31/46* (2006.01)
*A47J 31/60* (2006.01)

(56) References Cited

U.S. PATENT DOCUMENTS

| | | |
|---|---|---|
| 5,239,519 A | 8/1993 | Nelson |
| 5,259,297 A | 11/1993 | Guiliano |
| 5,372,061 A | 12/1994 | Albert |
| 5,462,236 A | 10/1995 | Knepler |
| 5,555,791 A | 9/1996 | McNeill et al. |
| 5,870,943 A | 2/1999 | Levi |
| 6,058,986 A | 5/2000 | Bethuy |
| 6,067,894 A | 5/2000 | Eugster |
| 6,085,637 A | 7/2000 | Fukushima |
| 6,155,158 A | 12/2000 | Anson |
| 6,164,189 A | 12/2000 | Anson |
| 6,459,854 B1 | 10/2002 | Yoakim et al. |
| 6,550,370 B2 | 4/2003 | Dam |
| 6,611,660 B1 | 8/2003 | Sagal |
| 7,461,585 B2 | 12/2008 | Nenov |
| 8,215,229 B2 | 7/2012 | Faccinti |
| 8,272,319 B2 | 9/2012 | Jarisch |
| 8,663,724 B1 | 3/2014 | Banasik |
| 8,696,899 B2 | 4/2014 | Roulin |
| 8,850,956 B2 | 10/2014 | Bianchi et al. |
| 8,850,959 B2 | 10/2014 | Banchi et al. |
| 8,857,318 B2 | 10/2014 | Zhong |
| 8,895,095 B2 | 11/2014 | Star et al. |
| 9,125,519 B2 | 9/2015 | Goeltenboth et al. |
| 9,578,986 B2 | 2/2017 | Ceotto et al. |
| 9,924,828 B2 | 3/2018 | Grassia |
| 9,986,870 B2 | 6/2018 | Reyhanloo |
| 10,602,874 B2 | 3/2020 | Cable |
| 10,687,660 B2 | 6/2020 | Gatti et al. |
| 10,881,242 B2 | 1/2021 | Dionisio et al. |
| 11,103,104 B2 | 8/2021 | Bakke et al. |
| 11,122,927 B2 | 9/2021 | Bianchi et al. |
| 2004/0079237 A1 | 4/2004 | Denisart |
| 2004/0244599 A1 | 12/2004 | Wei |
| 2005/0011364 A1 | 1/2005 | Chen et al. |
| 2006/0037481 A1 | 2/2006 | Bicht |
| 2006/0150821 A1 | 7/2006 | Paul |
| 2006/0278093 A1 | 12/2006 | Biderman et al. |
| 2006/0283329 A1 | 12/2006 | Ronci |
| 2007/0051247 A1 | 3/2007 | Felty |
| 2007/0193452 A1 | 8/2007 | Campetella et al. |
| 2007/0227363 A1 | 10/2007 | Verna |
| 2007/0277676 A1 | 12/2007 | Crivellin |
| 2008/0000272 A1* | 1/2008 | Park ............... D06F 34/22 68/12.03 |
| 2008/0190297 A1 | 8/2008 | Gussmann |
| 2009/0095165 A1 | 4/2009 | Nosler |
| 2009/0114099 A1 | 5/2009 | Gotlenboth |
| 2009/0205502 A1 | 8/2009 | Carbonini |
| 2010/0005971 A1 | 1/2010 | Faccinti |
| 2010/0018407 A1 | 1/2010 | Liu |
| 2010/0030222 A1 | 1/2010 | Rehanloo |
| 2010/0112165 A1 | 5/2010 | Masciandaro et al. |
| 2010/0229728 A1 | 9/2010 | Kiefer et al. |
| 2010/0233337 A1 | 9/2010 | Aigner |
| 2010/0263543 A1 | 10/2010 | Krauchi |
| 2010/0282090 A1 | 11/2010 | Etter |
| 2010/0300299 A1 | 12/2010 | Epars et al. |
| 2011/0005398 A1 | 1/2011 | Garcia |
| 2011/0042408 A1 | 2/2011 | Giordano |
| 2011/0048243 A1 | 3/2011 | Bambi |
| 2011/0117259 A1 | 5/2011 | Storek |
| 2012/0017767 A1 | 1/2012 | Samso Besora |
| 2012/0090474 A1 | 4/2012 | Carbonini |
| 2012/0118164 A1 | 5/2012 | Tonelli et al. |
| 2012/0121780 A1 | 5/2012 | Lai et al. |
| 2012/0171332 A1 | 7/2012 | Lai |
| 2012/0222666 A1 | 9/2012 | Morgandi |
| 2013/0098249 A1 | 4/2013 | Fidler et al. |
| 2013/0330453 A1 | 12/2013 | Doglioni Majer |
| 2014/0137746 A1 | 5/2014 | Moran et al. |
| 2014/0314921 A1 | 10/2014 | Kuempel et al. |
| 2014/0352543 A1 | 12/2014 | Boni |
| 2015/0245736 A1 | 9/2015 | Reyhanloo |
| 2016/0249763 A1 | 9/2016 | Llopis |
| 2017/0119195 A1 | 5/2017 | Al-Sahibani |
| 2018/0055275 A1 | 3/2018 | Bianchi et al. |
| 2018/0271319 A1 | 9/2018 | Gatti et al. |
| 2018/0303284 A1 | 10/2018 | Gatti et al. |
| 2018/0360257 A1 | 12/2018 | Dionisio et al. |
| 2019/0075964 A1 | 3/2019 | Della Pietra et al. |
| 2020/0093323 A1 | 3/2020 | Dionisio et al. |
| 2020/0237137 A1 | 7/2020 | Bakke et al. |
| 2021/0204748 A1 | 7/2021 | Della Pietra et al. |

FOREIGN PATENT DOCUMENTS

| | | | |
|---|---|---|---|
| CN | 1424886 A | 6/2003 | |
| CN | 101229019 A | 7/2008 | |
| CN | 101398405 A | 4/2009 | |
| CN | 101600377 A | 12/2009 | |
| CN | 100588354 C | 2/2010 | |
| CN | 201401779 Y | 2/2010 | |
| CN | 202179442 U | 4/2012 | |
| CN | 102595984 A | 7/2012 | |
| CN | 102761565 | 10/2012 | |
| CN | 103118574 A | 5/2013 | |
| CN | 203 122 128 | 8/2013 | |
| CN | 103391734 A | 11/2013 | |
| CN | 104080379 A | 10/2014 | |
| CN | 104619218 A | 5/2015 | |
| CN | 105640339 A | 6/2016 | |
| CN | 106073509 A | 11/2016 | |
| DE | 29 19 110 | 11/1980 | |
| DE | 10 2011 116 913 A1 | 9/2012 | |
| DE | 10 2013 107077 | 1/2015 | |
| EP | 0 838 185 | 4/1998 | |
| EP | 1 034 729 | 9/2000 | |
| EP | 1 688 072 B1 | 8/2006 | |
| EP | 1 747 736 | 1/2007 | |
| EP | 1 886 604 A1 | 2/2008 | |
| EP | 2 218 374 A2 | 8/2010 | |
| EP | 2 314 182 | 4/2011 | |
| EP | 2 316 796 | 5/2011 | |
| EP | 2316796 A2 * | 5/2011 | ............ A47J 31/60 |
| EP | 2 490 580 | 8/2012 | |
| EP | 2 490 578 | 9/2013 | |
| EP | 2 644 066 | 10/2013 | |
| EP | 2 701 563 | 3/2014 | |
| EP | 2 789 276 | 10/2014 | |
| EP | 3 042 591 | 7/2016 | |
| EP | 3 064 099 | 9/2016 | |
| EP | 3 167 782 | 5/2017 | |
| EP | 3 225 141 | 10/2017 | |
| EP | 3 329 815 | 6/2018 | |
| FR | 1 174 038 | 3/1959 | |
| FR | 1 449 310 | 8/1966 | |
| FR | 2 901 681 | 12/2007 | |
| GB | 726 272 | 3/1955 | |
| GB | 728 476 | 4/1955 | |
| JP | 51-121392 A | 10/1976 | |
| JP | 2004-105274 A | 4/2004 | |
| JP | 2004-121544 A | 4/2004 | |
| JP | 2004-534562 A | 11/2004 | |
| JP | 2005-040605 A | 2/2005 | |
| JP | 2009-537260 A | 10/2009 | |

(56) References Cited

FOREIGN PATENT DOCUMENTS

| | | |
|---|---|---|
| JP | 2012-035040 A | 2/2012 |
| JP | 2014-506820 A | 3/2014 |
| JP | 2015-518381 A | 7/2015 |
| JP | 2015-144714 A | 8/2015 |
| RU | 2 639 067 | 12/2017 |
| WO | WO 2006/082064 | 8/2006 |
| WO | 1 898 758 B1 | 11/2006 |
| WO | WO 2008/114210 | 9/2008 |
| WO | WO 2009/010190 | 1/2009 |
| WO | WO 2010/113116 | 10/2010 |
| WO | WO 2011/055189 | 5/2011 |
| WO | WO 2011/095926 | 8/2011 |
| WO | WO 2011/140582 | 11/2011 |
| WO | WO 2012/138327 A1 | 10/2012 |
| WO | WO 2012/146641 A1 | 11/2012 |
| WO | WO 2013/112732 | 8/2013 |
| WO | WO 2013/121438 | 8/2013 |
| WO | W0 2014/187110 A1 | 11/2014 |
| WO | WO 2014/177925 | 11/2014 |
| WO | WO 2014/207281 | 12/2014 |
| WO | WO 2015/006244 A1 | 1/2015 |
| WO | WO 2015/055342 A1 | 4/2015 |
| WO | WO 2015/055557 | 4/2015 |
| WO | WO 2016/057568 | 4/2016 |
| WO | WO 2016/093920 | 6/2016 |
| WO | WO 2017/009186 | 1/2017 |
| WO | WO 2017/009189 | 1/2017 |
| WO | WO 2017/068021 | 4/2017 |
| WO | WO 2018/115876 | 6/2018 |
| WO | WO 2018/219878 | 12/2018 |
| WO | WO 2018/234241 A1 | 12/2018 |

OTHER PUBLICATIONS

U.S. Appl. No. 17/422,904, filed Jul. 14, 2021, entitled "Ultrasonic Cleaner Device for an Espresso Coffee Machine and Espresso Coffee Machine Incorporating Such a Cleaner Device".
U.S. Appl. No. 17/428,128, filed Aug. 3, 2021, entitled "Coffee Grinding Machine With Improved Dosing System and Associated Method".
U.S. Appl. No. 17/428,181, filed Aug. 3, 2021, entitled "Coffee Grinding Machine Configured to Provide Different Particle Size Profiles and Associated Method".
International Search Report for PCT/EP2016/066181, mailed Oct. 5, 2016, 3 pages.
International Search Report for PCT/EP2016/074726, mailed Jan. 31, 2017, 2 pages.
International Search Report for PCT/EP2016/075182 mailed Feb. 23, 2017, 4 pages.
Written Opinion of the ISA for PCT/EP2016/075182 mailed Feb. 23, 2017, 5 pages.
English Translation for CN 102761565 published Oct. 2012.
English translation of JP Office Action mailed Jun. 8, 2021 in JP application 2018-517145.
International Search Report for PCT/EP2016/066186, mailed Aug. 12, 2016, 3 pages.
Office Action mailed Dec. 10, 2019 in U.S. Appl. No. 15/739,856.
International Search Report for PCT/EP2017/052213, mailed May 4, 2017, 3 pages.
International Search Report and Written Opinion mailed Jun. 9, 2016, issued in PCT/EP2016/053894.
International Search Report for PCT/IB2018/051865, mailed Jul. 2, 2018, 3 pages.
Written Opinion of the ISA for PCT/IB2018/051865, mailed Jul. 2, 2018, 5 pages.
Chinese Office Action and English translation mailed Mar. 31, 2021 in Chinese Application 201880018668.5.
Yingile et al., "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/EP2019/079672 mailed Dec. 18, 2019, 3 pages.
Written Opinion of the ISA for PCT/EP2019/079672 mailed Dec. 18, 2019, 5 pages.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion mailed Jun. 15, 2015, issued in corresponding International Application PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.
International Search Report for PCT/IB2019/054750, mailed Aug. 13, 2019, 4 pages.
Written Opinion of the ISA for PCT/IB/2019/057750, mailed Aug. 13, 2019, 5 pages.
International Search Report for PCT/EP2020/051464, mailed Apr. 21, 2020, 4 pages.
Written Opinion of the ISA for PCT/EP2020/051464, mailed Apr. 21, 2020, 6 pages.
International Search Report for PCT/EP2019/080559, mailed Feb. 11, 2020, 5 pages.
Written Opinion of the ISA for PCT/EP2019/080559, mailed Feb. 11, 2020, 5 pages.
International Search Report for PCT/IB2020/050905 mailed Aug. 4, 2020, 3 pages.
Written Opinion of the ISA for PCT/IB2020/050905 mailed Aug. 4, 2020, 5 pages.
International Search Report for PCT/IB2020/050907 dated Apr. 6, 2020, 4 pages.
Written Opinion of the ISA for PCT/IB2020/050907 dated Apr. 6, 2020, 6 pages.
English translation of the CN Notification of the First Office Action mailed Aug. 31, 2022 in CN Application 201980069093.4.

\* cited by examiner

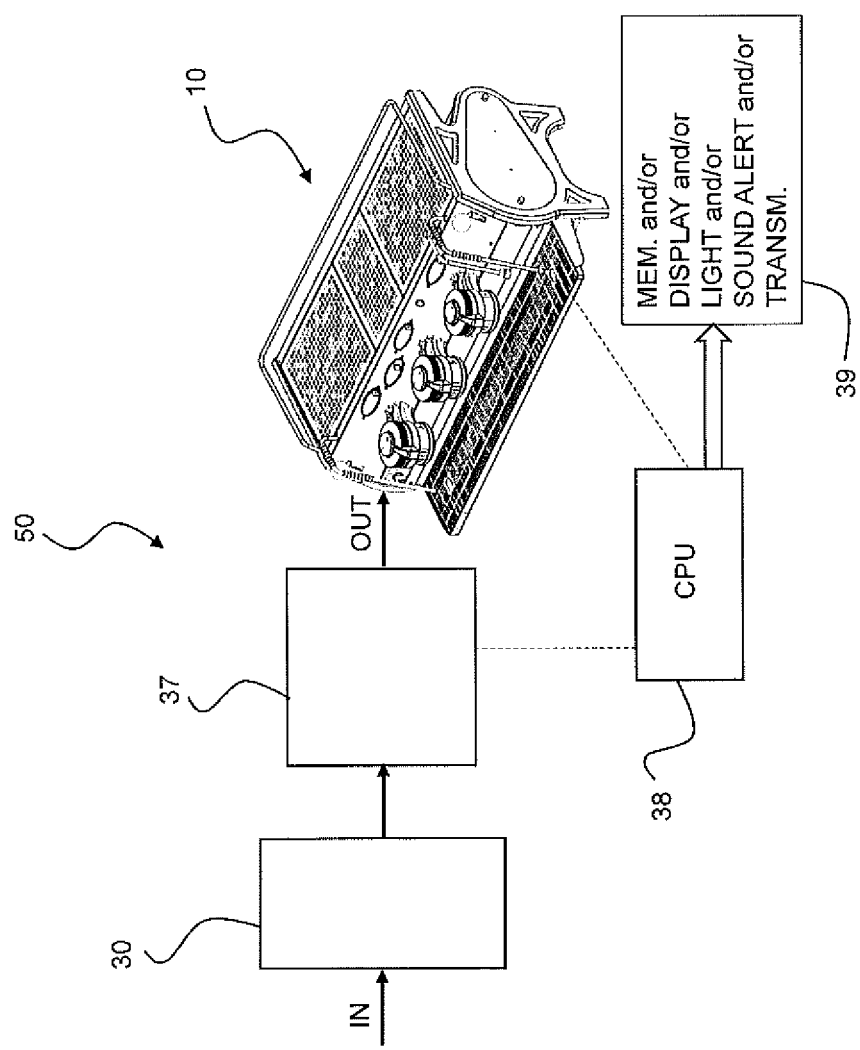
Fig. 3.1

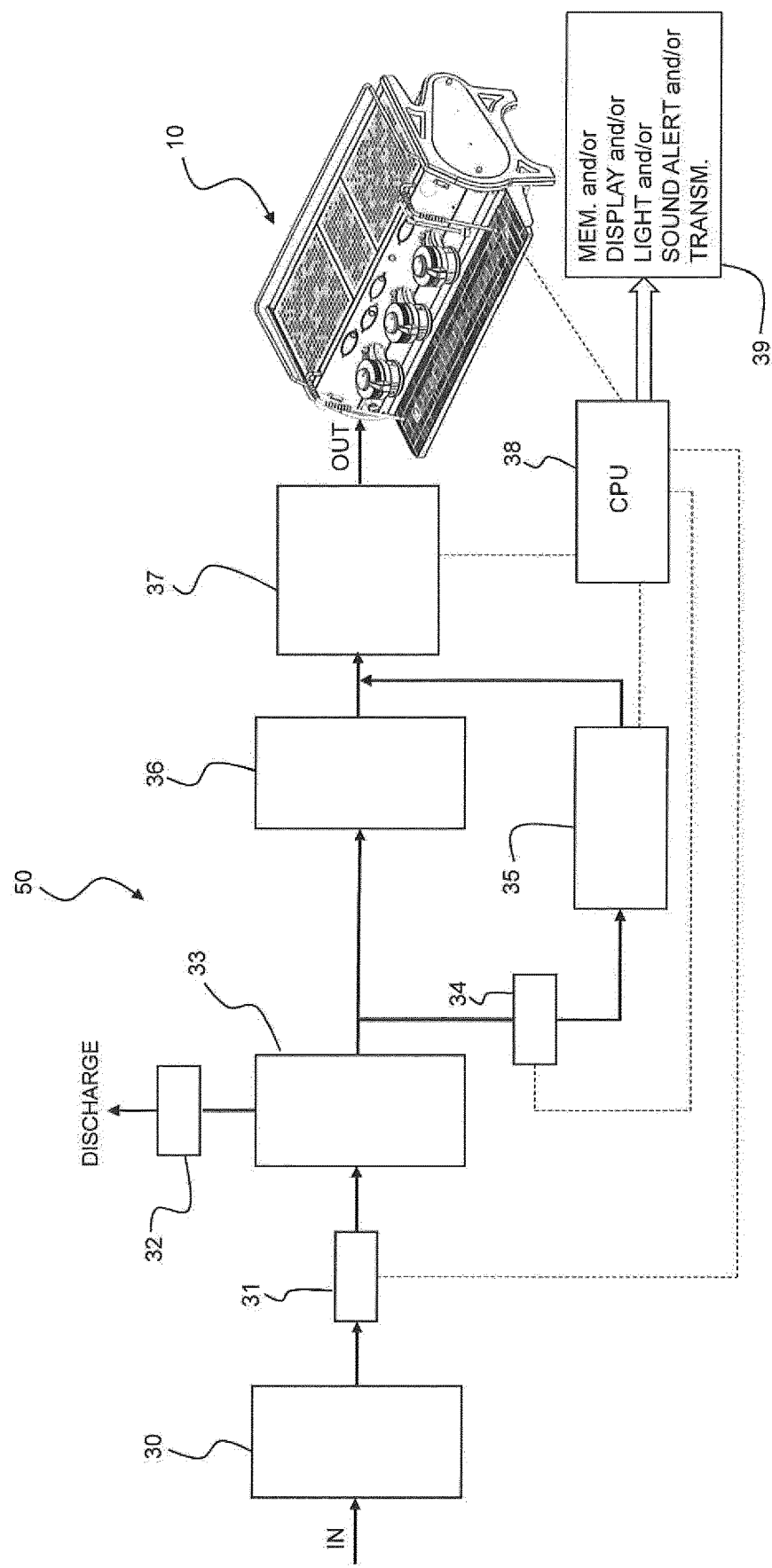
Fig. 3.2

ACTIVE SYSTEM FOR MONITORING AND FILTERING THE WATER FOR AN ESPRESSO COFFEE MACHINE AND ASSOCIATED ESPRESSO COFFEE MACHINE

This application is the U.S. national phase of International Application No. PCT/EP2019/079672 filed Oct. 30, 2019 which designated the U.S. and claims priority to IT Patent Application No. 102018000009919 filed Oct. 30, 2018, the entire contents of each of which are hereby incorporated by reference.

BACKGROUND OF THE INVENTION

The present invention relates in general to the sector of machines for the preparation of beverages. More particularly it relates to an active system for monitoring and filtering the water for an espresso coffee machine The present invention relates also to an espresso coffee machine comprising such a system.

PRIOR ART

Water is the qualitatively most important ingredient in espresso coffee and, after the coffee itself, the ingredient which influences most the taste of the beverage.

Leaving aside the different types of process for obtaining the beverage, the most important element, alongside the primary product (coffee), is the "extraction liquid". It is not a coincidence that 95-98% of the composition of a cup of coffee, be it espresso coffee or filter coffee, mocha or boiled beverage, consists of water. This vital element may contain different substances able to modify the final result of the beverage in terms of smell and taste. In fact, not only is it an inert, colourless, tasteless and odourless solvent, but it may also be regarded to all intents and purposes as being a fundamental ingredient for the final quality.

Typically, companies which manage the water supply systems and supply water use chlorine-based substances. In fact, chlorine plays an important role as a disinfectant. However, if on the one hand, chlorine protects consumers from a bacteriological point of view, on the other hand it has an extremely negative effect on the final quality of the coffee. Moreover, it also negatively affects the formation of the cream since the chlorine compounds which are formed, in particular in hot conditions, have a strong oxidizing power, acting on the "fats" present in the coffee.

Some coffee roasters and/or coffee machine producers collect general information about the water supplied in the various zones, in particular in relation to the presence of chlorine and the degree of hardness, expressed as a unit of measurement in French degrees (F.).

On the other hand, recent analyses of the sensorial aspects of coffee, such as the aroma, its lingering flavour in the mouth, its taste, the quality and the consistency of the foam and its capacity to heighten the organoleptic properties demonstrate the importance of some mineral salts, in particular calcium salt. In the light of the above it would be counter-productive to use oligomineral waters since a water with a given hardness provides a better quality of the beverage, a full-bodied character and syrupy consistency, as well as producing a supple and stable cream.

The Applicant has noted that at present the chemical composition of the water which supplies a coffee machine has a very great variability considering both various locations in same country and, all the more so, different countries.

The water which is provided by the public water mains contains variable quantities of ions, for example calcium and magnesium ions (hardness) and, if it is not suitably treated, may form in a very short time unacceptable deposits inside the espresso coffee production machine. This occurs for example owing to the precipitation of insoluble salts such as calcium carbonate and magnesium hydroxide.

At present it is known to overcome this drawback by softening the water. In particular, the sodium ions replace the ions responsible for the hardness, preventing the deposition of limescale (calcium carbonate and magnesium carbonate). The Applicant has noted, however, that this strategy has an effect on the sensorial characteristics of espresso coffee since it modifies also the pH of the beverage.

The Applicant has also noted that the presence of carbonates and bicarbonates together with the sodium hinders percolation of the coffee, increasing the extraction time of the beverage. This combination of ions causes swelling of the coffee powder (with particular reference to the insoluble polysaccharides such as a mannan and cellulose) which reduces the porosity of the coffee powder puck and causes an increase in the percolation time by about 50%. Moreover, the presence of bicarbonate and sodium increases the quantity of cream in the cup.

Moreover, the sodium ion has the capacity of extracting a lot of the bitter volatile aromatic compounds such as caffeine and trigonelline.

The opposite strategy to softening consists in the use of demineralized water for the infusion. This type of water, if heated and exposed to the air, may however become aggressive for the coffee machine and moreover may have a poor capacity to extract the aromas and the substances which give the beverage its sensorial value.

EP 2 316 796 A2 discloses a system for filtering water for apparatuses intended for producing beverages. The filtering system can be provided with a device for detecting the electric conductivity of the water circulating along the piping system. This detection system, consisting of a conductivity meter, operates for controlling the conductivity of the water produced by the filtering system according to the mineral salts dissolved in it.

U.S. Pat. No. 9,986,870 B2 discloses a device for providing liquid for a beverage machine and use thereof. Provision can additionally be made for the at least one filling level sensor to not only output a signal to the control device with regard to a reaching of the filing level, but that it is additionally designed to determine a tank water hardness.

SUMMARY OF THE INVENTION

The aim of the Applicant is to provide, for the purposes of increasing further the quality of the espresso coffee, a system for diagnosing the incoming water (in order to define the best filtering option) and the water processed by the filter (in order to monitor its efficiency over time). It is therefore essential to determine certain chemical parameters relating to the composition of the water which supplies a specific espresso coffee machine (in a specific location and at a specific time). Once these parameters (such as the total hardness, temporary hardness, chlorine, chlorides, pH, alkalinity, TDS (Total Dissolved Solids), iron) have been measured, filtering systems able to reduce or in any case modify the composition of these parameters in the water may be used.

The present limit of the state of the art in the sector is that both the measurements and the systems are passive. The Applicant, in addition to organizing specialist courses within companies, in order to heighten the awareness of espresso coffee machine users and technicians on the subject, also supplies water analysis kits together with the coffee machine.

The object of the present invention is to provide an instrument to be inserted in series at the water inlet of a coffee machine, said instrument allowing a real-time measurement of a number of significant chemical parameters which may provide important information about the quality of the incoming water. In this way the water may be treated with the appropriate technology. Alternatively or in addition, alarms or luminous or acoustic signals may be used in the case where the system detects values which are not within the predetermined ranges, in order to ensure the maximum quality of the beverage in the cup and preserve the quality and efficiency of the said coffee machine.

Advantageously, the instrument is able to provide the user of the espresso coffee machine automatically and clearly with information by means of visual messages (for example on a display or the like) and/or luminous signals and/or acoustic signals.

The parameters of the water which must be detected and monitored are one or more of the following:
pH
Alkalinity [ppm]
Temperature [° C./° F.]
TDS (total dissolved solid) [ppm]
Total hardness [ppm]
Total iron ($Fe^{+2}/Fe^{+3}$) [ppm]
Total chlorides (Cl—) [ppm]
Free chlorine ($Cl2$) [ppm]
Total chlorine ($C12$) [ppm]
Calculated Langelier index LSI The Applicant has noted that:

(a) some of the aforementioned parameters are determined and assessed by means of differential measurements and, typically, using techniques which cannot be continuously used;

(b) some of the aforementioned parameters may, during measurement, release undesirable ions. For example the measurement of the pH using a simple combined electrode may release ions into the water and certainly cannot remain immersed in the water for long periods of time.

According to the Applicant, the aforementioned parameters may be divided into two groups: the first group which comprises the parameters which will be measured by the personnel performing the installation and maintenance operations, while the second group comprises the parameters which may be monitored remotely and continuously.

The Applicant has found that there is a direct relation between the hardness and the conductivity of the water. According to the Applicant, it is therefore possible to derive information relating to the total hardness of the water, also continuously and if necessary from a remote position, based on conductivity measurements.

According to a first aspect, the present invention provides a machine for preparing and dispensing espresso coffee comprising:
a water supply;
a boiler to heat the water;
a pump;
a dispensing group configured to cooperate with a portafilter (filter holder) equipped with a filter basket with a puck of coffee powder, the machine being configured to supply pressurized water to said coffee powder puck for dispensing an espresso coffee, and
a water monitoring system for monitoring at least one parameter of the water used for preparing the espresso coffee, wherein said monitoring system comprises a conductivity and temperature probe which provides values, continuously and in real time, of water hardness derived from information (values) on the electrical conductivity and temperature of the water.

The machine may comprise a corrector configured to correct at least one of the detected parameters which does not fall within a given range. According to embodiments, the corrector comprises a remineralizer cartridge, which could be replaceable.

In embodiments, the machine further comprises a throttling device, wherein said throttling device is configured for receiving water upstream of the corrector and supplying water to the measuring device, so that the measuring device receives a part of water that has passed through the corrector and a part that has not been corrected by the corrector.

The throttling device may comprise a proportional valve.

In embodiments, the water monitoring system further comprises, upstream of the measuring device, a pre-filtering member for carrying out pre-filtering of the incoming water, in order to remove solid particles of a set size, which may be present in the water.

The corrector could be provided downstream of the pre-filtering member.

According to embodiments, measured values of electrical conductivity are directly proportional to water hardness values in a substantially linear relationship.

According to embodiments, the system comprises a transmitter and/or a display for transmitting said derived water hardness values to a remote receiver and/or for displaying said derived water hardness values.

According to embodiments, the machine further comprises a water treatment device, either based on reverse osmosis or a salt water softener.

According to embodiments, the system comprises a processing unit for processing at least part of the measured values.

According to embodiments, the water monitoring system is arranged upstream of said water supply or upstream of said coffee boiler or steam boiler.

According to a second aspect, the present invention provides a method of monitoring at least one parameter of the water used for preparing espresso coffee in a machine for preparing and dispensing espresso coffee, the machine comprising:
a water supply;
a boiler to heat the water;
a pump; and
a dispensing group configured to cooperate with a portafilter (filter holder) equipped with a filter basket with a coffee powder puck, the machine being configured to supply pressurized water to said coffee powder puck for dispensing an espresso coffee,
the method comprising obtaining, continuously and in real time, values of water hardness derived from information on the electrical conductivity and temperature of the water.

According to embodiments, the method further comprises correcting water hardness if it does not fall within a given range of water hardness.

According to embodiments, the method further comprises providing a throttling device, wherein said throttling device is configured for receiving water upstream of the corrector and supplying water to the measuring device, so that the measuring device receives a part of water that has passed through the corrector and a part that has not been corrected by the corrector.

According to embodiments, the measured electrical conductivity values are directly proportional to water hardness values in a substantially linear relationship.

According to embodiments, the method further comprises, upstream of the measuring device, carrying out a pre-filtering of the incoming water, in order to remove solid particles of a certain size which may be present in the water.

According to embodiments, the step of correcting is performed downstream of the pre-filtering step.

BRIEF DESCRIPTION OF THE DRAWINGS

The present invention will become completely clear from the following detailed description, provided by way of a non-limiting example, to be read with reference to the attached drawings in which:

FIG. 3.1 is a simplified illustration of a system according to a first embodiment of the present invention; and FIG. 3.2 is a simplified illustration of a system according to a second embodiment of the present invention.

DETAILED DESCRIPTION

Figure 1:
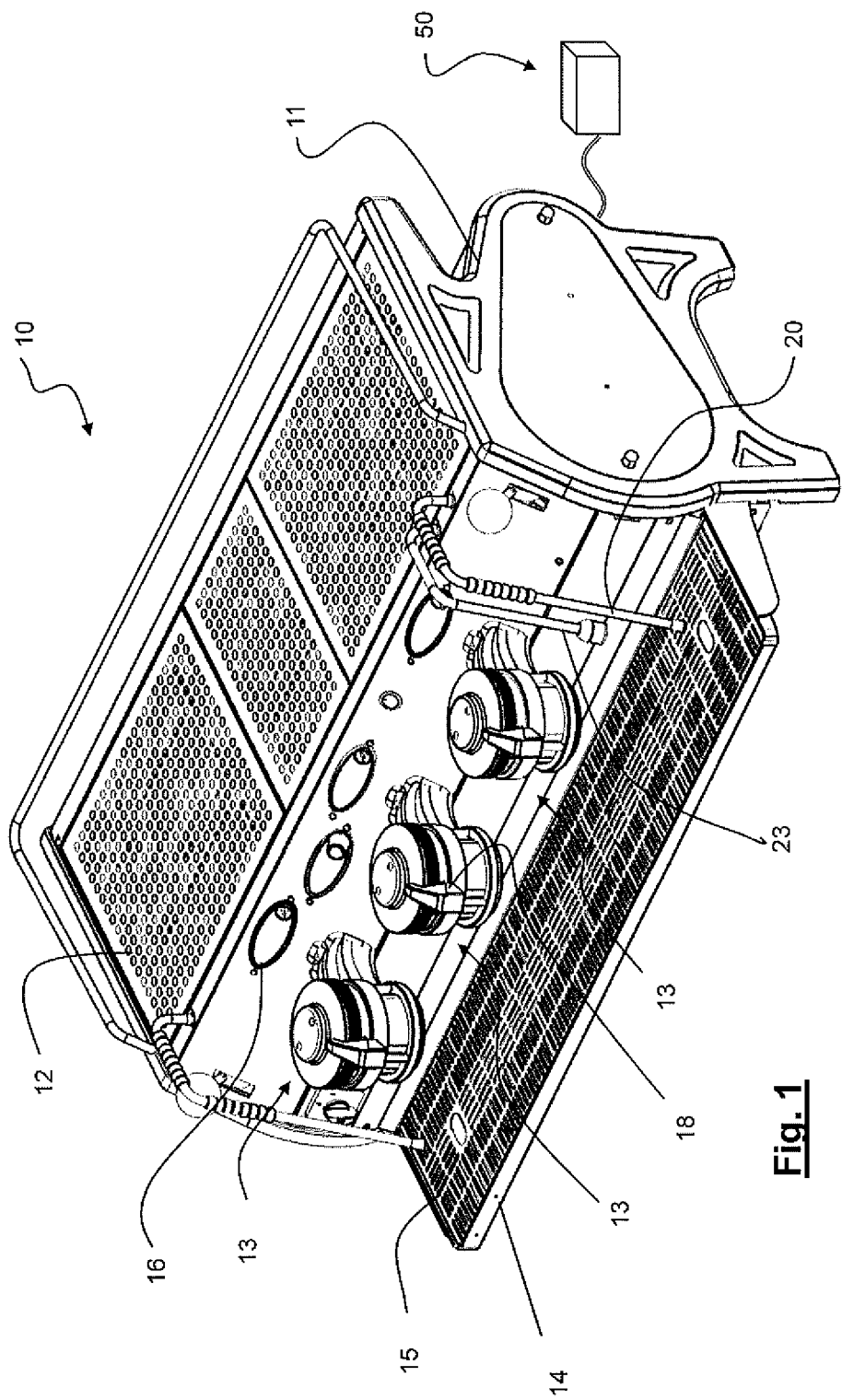
FIG. 1 is an illustrative diagram of an espresso coffee machine comprising the system according to the present invention.

FIG. 1 shows, purely by way of example, an espresso coffee machine denoted overall by the reference number 10. The machine 10 comprises a substantially closed machine body 11 which houses the main components of the machine, some of which will be described below. At the top, preferably, the machine 10 comprises a surface 12 on which the cups may be placed. An electrical resistance (not shown) or other heating system for heating the cups on the surface 12 may also be provided.

The machine 10 comprises at least one dispensing group 13 for dispensing espresso coffee. Preferably, the machine 10 comprises several dispensing groups 13, for example three groups, like the machine shown by way of example in FIG. 1. There could also be two, four or more groups. A drip tray 14, which is preferably partially closed at the top by a grille 15, is preferably present underneath the dispensing groups 13. Typically the coffee cups are placed on the grille 15 during dispensing of the espresso coffee.

A portafilter for supporting a filter basket for a coffee powder puck may be removably connected to each dispensing group 13.

Preferably, the machine 10 may comprise one or more displays 16 and pushbuttons, for example for switching on/off the machine and/or for starting/ending dispensing.

The machine 10 shown in FIG. 1 also comprises, for each dispensing group 13, a lever 18 (or pushbutton not shown in the figure) for starting/ending dispensing of the espresso coffee and/or for modifying the dispensing pressure during dispensing of the espresso coffee.

According to the present invention, the machine 10 also comprises a system 50 configured at least to monitor at least one parameter relating to the water which enters into the machine and/or the water processed by the machine 10.

It is known that the conductivity of water is related to the amount of all the salts dissolved therein: an higher amount of salts results in a higher conductivity.

It is also known that the hardness of water is due to the presence of calcium and/or magnesium salts, and is the result of the sum between the so called "temporary hardness", mainly due to bicarbonates, and the "permanent hardness", mainly due to sulphates and chlorides.

Both these parameters are also highly affected by the temperature. In particular, the conductivity tends to increase when the temperature increases, while the temporary hardness decreases and the permanent hardness is not significantly affected.

Therefore, while the conductivity is related to any ionic species dissolved in the water, hardness is specifically related to $Mg^+$ and $Ca^+$.

The Applicant has therefore faced the problem to provide a device able to provide, in real time and continuously, a hardness value from a conductivity measurement.

The Applicant has carried out a series of experimental laboratory tests and tests during real operation of the machine. After extensive experimentation, the Applicant has surprisingly found that there is a direct relationship between the hardness and the conductivity of the water being examined. In turn, as opposed to the hardness measurements known in the art, the conductivity measurement is a measurement which can be carried out continuously or also remotely.

Such a measurement can be carried out upstream of the espresso coffee machine or in the hydraulic circuit of the machine (for example upstream of the coffee boiler or the steam boiler), therefore on water having different temperatures, while still providing a reliable correlation between the conductivity measured and the extrapolated hardness.

Figure 2:
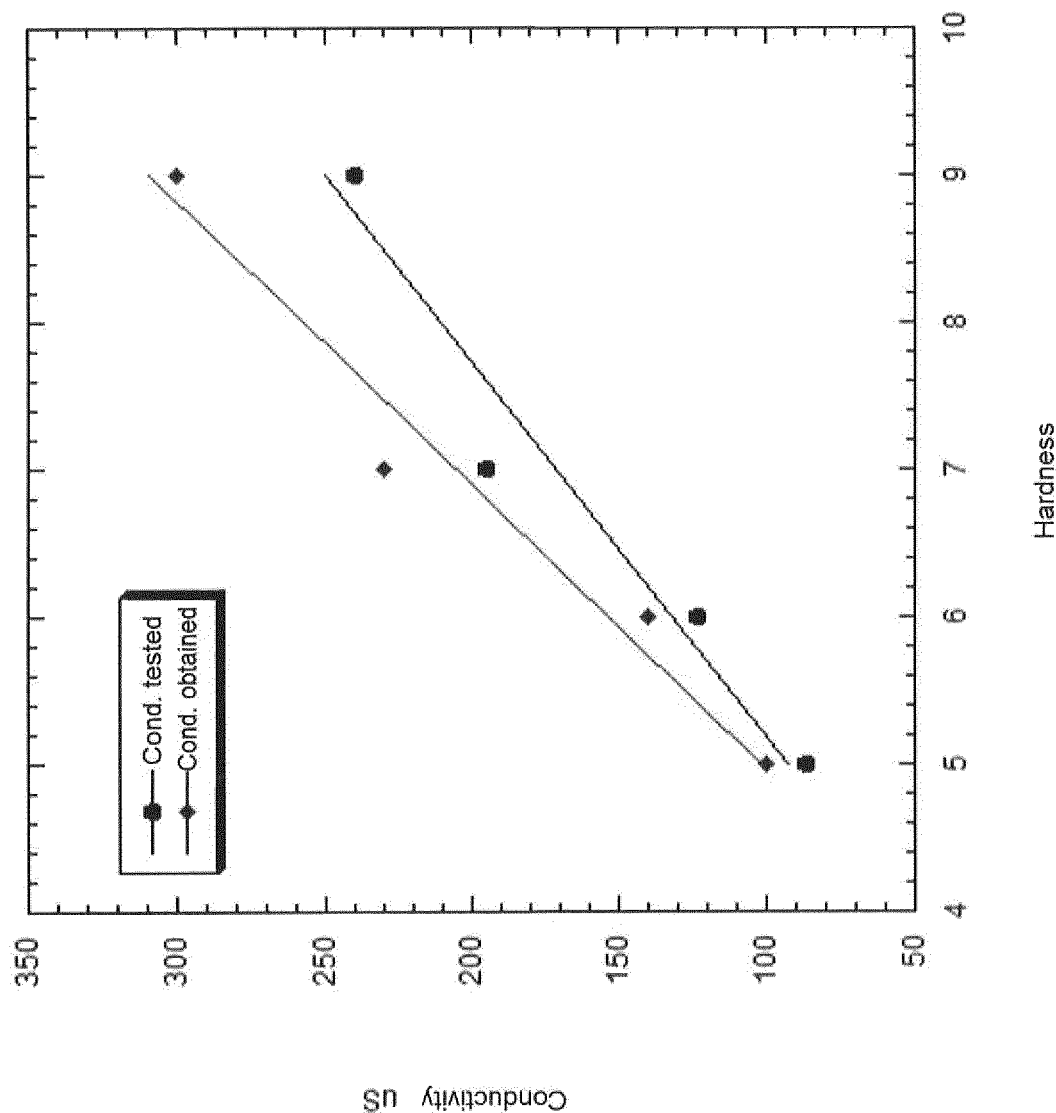
FIG. 2 is a graph showing the water hardness plotted against the conductivity.

The first experimental measurements related to an evaluation of the direct correlation between conductivity and hardness in drinking water. FIG. 2 is a graph which shows the substantially linear relationship between hardness and conductivity of some water examples depending on their conductivity. A first curve (rhombus-shaped points in the graph) relates to the process water, measured directly by the Applicant using a sensor during operating conditions (after passing through the boiler). The second curve (square-shaped points in the graph) relates to mineral waters tested in a laboratory using a conductivity meter.

The process waters were collected after passing through the boiler by the Applicant with varying conductivity values and the hardness measured.

The results illustrated in FIG. 2 show that there exists a substantial linearity between the hardness and the conductivity measured using different apparatus. In both cases the linear correlation factor is high and confirms the validity of the results achieved.

By way of a non-limiting example, below the equations of two straight lines are shown below. The first equation (I) is derived from tests carried out in real conditions on process water. The second equation (II) was obtained experimentally from tests on mineral water.

$$y=-156.57+51.714x\ R^2=0.98183 \qquad (I)$$

$$y=-104.31+39.343x\ R^2=0.97263 \qquad (II)$$

As indicated above, the determination coefficient $R^2$, which represents a proportion between the variability of the data and the correctness of the statistical model used, is very close to 1. This indicates that the model provides an almost perfect explanation of the data.

More generally, the relationship between hardness and conductivity may be considered to be a linear relationship with a gradient of between about 30 and about 60, preferably between about 35 and about 55 and more preferably between about 40 and about 50.

A probe may be used for continuous measurement of the conductivity.

For example, a conductivity meter, model CS-958P3-6FF-S8 (L=0.2-20 mS), marketed by AVS Ing. J. C. Römer GmbH, Königsdorf, Germany, may be used. With reference to FIG. 3.1, the system 50 comprises a measuring device 37 arranged upstream of the espresso coffee machine 10 or in the hydraulic circuit of the machine 10 (for example upstream of the coffee boiler or the steam boiler). Typically, the measuring device 37 is situated downstream of a pre-filtering member 30 which in turn receives water from the mains water pipes or from any other water source (or storage tank).

The measuring device 37 is able to detect at least one of the following parameters of the water:
pH
Alkalinity [ppm]
Temperature [° C./° F.]
TDS (total dissolved solid) [ppm]
Total hardness [ppm]
Total iron (Fe+2/Fe+3) [ppm]
Total chlorides (Cl—) [ppm]
Free chlorine (Cl2) [ppm]
Total chlorine (C12) [ppm]

The measuring device 37 may comprise for example a conductivity meter of the aforementioned type which provides water hardness measurements derived from information relating to the conductivity of the water. The measurements are preferably provided in real time. Profitably, the measuring device may also comprise a temperature sensor for measuring temperature of the water. A water conductivity meter and a water temperature sensor might be integrated in a single device or could be interconnected.

The information relating to the parameters detected by the measuring device 37 are supplied to a processing unit 38. By means of the processing unit 38 the detected information may be shown on a display, for example a display of the espresso coffee machine 10 or a display on the device 50. In addition or alternatively, the detected information may be stored in a memory unit for example provided on a board (for example a board on which the processing unit 38 is also mounted). In addition or alternatively, the detected information may be transmitted to another device or to a server by means of any transmission system and by any means (for example by cable or wirelessly). it is possible to use the Bluetooth standard which, as is known, provides a standard method for exchanging information between different devices via a secure short-range radio frequency. In addition or alternatively, the machine 10 may be provided with warning lamps and/or sound alarms in order to alert the user about the information detected by the measuring device 37. For example, a warning lamp may be provided in order to alert the barman that the pH of the water is not within the predetermined range considered to be acceptable.

FIG. 3.2 shows another system 50 comprising a measuring device 37 as indicated above. The system 50 according to FIG. 3.2 is an active system configured to adjust at least some of the parameters detected in order to reset them to correct values should it be detected that these values do not fall within certain ranges.

The system 50 according to FIG. 3.2 also comprises, preferably, upstream of the measuring device 37, a pre-filtering member 30 for carrying out pre-filtering of the incoming water (IN). The object of the pre-filtering member (30) is to remove the solid particles (for example those with a size greater than about 5 microns) which may be present in the water. A device 33 for treating the water and a corrector/integrator member 36 is preferably provided downstream of the pre-filtering member 30. The water treatment device 33 may comprise any known purifier, for example a purifier based on reverse osmosis or a salt water softener. The corrector/integrator 36 is configured to correct (optionally integrating) at least some of the detected parameters which do not fall within certain ranges. The corrector 36 may comprise for example a replaceable remineralizer cartridge.

Preferably, a throttling device 35 may also be provided, said device receiving water upstream of the corrector 36 and supplying water to the measuring device 37. In this way the measuring device 37 receives a part of water that has passed through the corrector 36 and a part that has not been corrected and/or integrated by the corrector. The throttling device may be for example a proportional valve 35.

Preferably, the system 50 comprises one or more flowrate measuring devices. For example, a first flowmeter 31 may be provided upstream of the water treatment device 33 and a second flowmeter may be provided upstream of the throttling device. A third flowmeter 32 may also be provided for monitoring the discharge water flow from the water treatment device 33.

According to the present invention, the processing unit 38 is connected to the measuring device 37 and processes the information received relating to the water parameters. The processing unit 38 is also connected to the throttling device 35. On the basis of the information received by the measuring device 37, the processing unit 38 controls the operation of the throttling device 35 so that it supplies a different amount of water to the input of the measuring device. For example, if the measuring device detects a small amount of minerals not in line with the set parameters, the throttling device 35 correspondingly throttles the water flow passage so that a greater amount of water passes through the corrector 36. However, if the measuring device 37 detects an excess of mineral substances, the throttling device 35 opens correspondingly the water flow passage so that a smaller quantity of water passes through the corrector 36. Preferably, the processing unit 3 is also connected to one or more of the aforementioned flowrate measuring devices 31, 32 and 34.

In this way an active monitoring and correction system is provided, said system monitoring and correcting continuously one or more parameters of the water so that the water supplied to the coffee machine 10 has parameters in line with those established and considered to be optimal.

Table 1 shows the range of optimum values for some parameters of the water to be used to produce espresso coffee.

TABLE 1

Water specification table

|  |  | Min. | Max. |
|---|---|---|---|
| TDS | ppm | 90 | 150 |
| Total hardness | ppm | 70 | 100 |
| Total iron (Fe$^{+2}$/Fe$^{+3}$) | ppm | 0 | 0.02 |
| Free chlorine (Cl$_2$) | ppm | 0 | 0.05 |
| Total chlorine (Cl$_2$) | ppm | 0 | 0.1 |

TABLE 1-continued

Water specification table

| | | Min. | Max. |
|---|---|---|---|
| TDS | ppm | 90 | 150 |
| pH | value | 6.5 | 8.5 |
| Alkalinity | ppm | 40 | 80 |
| Chlorine (Cl⁻) | ppm | Not greater | 50 |

According to the present invention, a method for treating the water used in an espresso coffee machine is also provided. The method envisages measuring the water conductivity and deriving water hardness measurements from these conductivity measurements.

On the basis of this conductivity information and/or on the basis of derived hardness measurements and/or on the basis of other measurements carried out on the water considered, the water is at least partially treated (for example using a purifier based on reverse osmosis or a salt water softener) and/or corrected/integrated so as to correct (if necessary integrating with a predefined amount of predetermined substances) at least some of the detected parameters which do not fall within certain ranges. The correction may be performed for example using a replaceable remineralizer cartridge.

Preferably, a throttling step is also envisaged (performed for example by means of a throttling device 35 which receives water upstream of the corrector 36 and supplies water to the measuring device 37). In this way the measuring device 37 receives a part of water that has passed through the corrector 36 and a part that has not been corrected and/or integrated by the corrector. The throttling device may be for example a proportional valve 35.

According to the present invention, the measurements are processed by a processing unit 38. The processing unit 38 is also connected to the throttling device 35. On the basis of the information received by the measuring device 37, the processing unit 38 controls operation of the throttling device 35 so that it supplies a different amount of water to the input of the measuring device. For example, if a small amount of minerals not in line with the set parameters is detected, the throttling device 35 correspondingly throttles the water flow passage so that a greater amount of water passes through the corrector 36. However, if the measuring device 37 detects an excess of mineral substances, the throttling device 35 opens correspondingly the water flow passage so that a smaller quantity of water passes through the integrator/corrector 36.

In this way an active monitoring and correction system is provided, said system monitoring and correcting continuously one or more parameters of the water so that the water supplied to the coffee machine 10 has parameters in line with those established and considered to be optimal.

The invention claimed is:

1. A machine for preparing and dispensing espresso coffee comprising:
   a water supply;
   a boiler to heat the water;
   a pump;
   a dispensing group configured to cooperate with a portafilter equipped with a filter basket with a puck of coffee powder, the machine being configured to supply pressurized water to said coffee powder puck for dispensing an espresso coffee, and
   a water monitoring system for monitoring at least one parameter of the water used for preparing the espresso coffee, wherein said monitoring system comprises a conductivity and temperature probe which provides values, continuously and in real time, of water hardness derived from information on the electrical conductivity and temperature of the water;
   a corrector configured to correct at least one of the monitored parameters which does not fall within a given range, wherein said corrector comprises a remineralizer cartridge.

2. The machine of claim 1, further comprising a throttling device, wherein said throttling device is configured for receiving water upstream of the corrector and supplying water to the conductivity and temperature probe, so that the conductivity and temperature probe receives a part of water that has passed through the corrector and a part that has not been corrected by the corrector.

3. The machine of claim 2, wherein the throttling device comprises a proportional valve.

4. The machine of claim 1, wherein the water monitoring system further comprises, upstream of the conductivity and temperature probe, a filter configured to carry out pre-filtering of the incoming water, in order to remove solid particles which may be present in the water.

5. The machine of claim 4, wherein said corrector is provided downstream of the filter.

6. The machine of claim 1, wherein measured values of electrical conductivity are directly proportional to water hardness values in a linear relationship.

7. The machine of claim 6, wherein said system comprises a transmitter and/or a display configured to transmit said derived water hardness values to a remote receiver and/or to display said derived water hardness values.

8. The machine of claim 1, further comprising a water treatment device, either based on reverse osmosis or a salt water softener.

9. The machine of claim 1, wherein said system comprises a processing unit configured to process at least part of the measured values.

10. The machine of claim 1, wherein said water monitoring system is arranged upstream of said water supply or upstream of said coffee boiler or steam boiler.

11. A method of monitoring at least one parameter of the water used for preparing espresso coffee in a machine for preparing and dispensing espresso coffee, the machine comprising:
    a water supply;
    a boiler to heat the water;
    a pump;
    a dispensing group configured to cooperate with a portafilter equipped with a filter basket with a coffee powder puck, the machine being configured to supply pressurized water to said coffee powder puck for dispensing an espresso coffee, and
    a corrector configured to correct at least one of the monitored parameters which does not fall within a given range, wherein said corrector comprises a remineralizer cartridge,
    the method comprising obtaining, continuously and in real time, values of water hardness derived from information on the electrical conductivity and temperature of the water.

12. The method of claim 11, further comprising correcting water hardness if it does not fall within a given range of water hardness.

13. The method of claim 12, further comprising providing a throttling device, wherein said throttling device is configured for receiving water upstream of the corrector (and supplying water to the conductivity and temperature probe, so that the conductivity and temperature probe receives a part of water that has passed through the corrector and a part that has not been corrected by the corrector.

14. The method of claim 11, wherein measured electrical conductivity values are directly proportional to water hardness values in a linear relationship.

15. A machine for preparing and dispensing espresso coffee comprising:
- a water supply;
- a boiler to heat water;
- a pump;
- a dispensing group configured to cooperate with a portafilter equipped with a filter basket with a puck of coffee powder, the machine being configured to supply pressurized water to said coffee powder puck for dispensing an espresso coffee, and
- a water monitoring system for monitoring at least one parameter of the water used for preparing the espresso coffee, wherein said monitoring system comprises a conductivity and temperature probe which provides values, continuously and in real time, of water hardness derived from information on the electrical conductivity and temperature of the water;
- a corrector configured to correct at least one of the monitored parameters which does not fall within a given range, wherein said corrector comprises a remineralizer cartridge;
- upstream of the conductivity and temperature probe, a filter configured to carry out pre-filtering of the incoming water, in order to remove solid particles which may be present in the water; and
- wherein the corrector is provided downstream of the filter member.

* * * * *